United States Patent Office 3,629,449
Patented Dec. 21, 1971

3,629,449
PROCESS OF COMBATTING HYPER-CHOLESTEROLEMIA
Majid Siddiqi and Zafarul Hasan Beg, c/o Aligarh Muslim University, Aligarh, Uttar Pradesh, India
No Drawing. Filed Apr. 22, 1968, Ser. No. 723,233
Int. Cl. A61k 27/00
U.S. Cl. 424—317     4 Claims

ABSTRACT OF THE DISCLOSURE

Hypercholesterolemic and hyperlipemic conditions in warm-blooded animals are prevented and/or corrected by the administration of 3-hydroxy-3-methylglutaric acid. Various administrative routes are possible, but oral is preferred, and a dosage level within the range of 1 milligram to about 100 milligrams per day per kilogram of body weight, in divided portions. Administration in accordance with the invention has been found to reduce the level of liver cholesterol as well.

---

This invention relates to a process of reducing the cholesterol level in warm-blooded animals, and embraces the reduction of lipid level in blood.

It has been known for about 100 years that atheromatous plaques as occur, for example, in arterial atherosclerosis in warm-blooded animals comprise large percentages of cholesterol and of fat. It is not surprising, therefore, that in recent years efforts have been made to devise procedures for reducing the serum cholesterol level, as well as the level of lipid matter in blood serum. Diet is thought to have a bearing on these levels, although the exact degree to which diet alone may be effective in all cases is not settled. Attention has therefore turned to chemotherapeutic agents, and while a number of these have been found, the side effects are frequently such as to render the agents not entirely satisfactory for routine use.

It is an object of the present invention to provide novel chemotherapy for hypercholesterolemia; for the maintenance of proper levels of serum cholesterol in warm-blooded animals for reduction in blood lipid levels; and reduction in liver cholesterol.

Other objects of the invention will appear as the description thereof proceeds.

Generally speaking, and in accordance with illustrative embodiments of our invention, we administer, by any of several routes but preferably orally, 3 - hydroxy-3-methylglutaric acid (sometimes abbreviated "HMG" hereinafter) to a warm-blooded animal afflicted with hypercholesterolemia or on such a diet that hypercholesterolemia would set in were it not for treatment in accordance with the invention. The dosage is variable within rather wide limits, and for oral administration, which we find best, is generally within the range of from 1 milligram to about 100 milligrams per kilogram of body weight per day, preferably in divided portions, for example, as included in the food normally ingested over a twenty-four hour period. As is common knowledge, warm-blooded animals have weights extending over a considerable range, from for example 0.05 kilogram as in the warm-blooded animals in the examples hereinbelow, to 100 kilograms or even more for the larger animals. Thus, the dosage just given, i.e., 1 miligram to about 100 milligrams per kilogram of body weight is readily seen to be equivalent on a per animal basis of from about $\frac{1}{20}$ milligram to about 10 grams.

Hydroxymethylglutaric acid is an article of commerce, and if desired it may be synthesized according to known procedures. It is water soluble, and may be administered as an aqueous solution, preferably freshly prepared, or in pill or capsule form, admixed as desired with the usual excipients, such as sugar or starch, or indeed any other pharmaceutically acceptable carrier. Thus, the administration form of the hydroxymethylglutaric acid will be present in unit dosage at a level of about $\frac{1}{20}$ milligram to about 10 grams dispersed in the selected pharmaceutical carrier. The hydroxymethylglutaric acid is of course the primary active ingredient in such a therapeutic composition, in accordance with the invention.

To show the action at a range of typical dosage levels, four groups of young male albino rats weighing 50 grams, with each group containing 6 animals, were treated as follows: Group I was kept as a control and fed on a standard laboratory diet. Groups II, III and IV received orally doses of HMB in water of, respectively, 10, 20 and 30 milligrams per kilogram daily for seven or 14 days. At the end of the treatment, the total serum cholesterol was determined. The results are shown in Table 1, in which serum cholesterol is expressed as milligrams percent:

TABLE 1

| Days | I<br>Basal diet | II<br>Basal diet plus 10 mg HMG | III<br>Basal diet plus 20 mg HMG | IV<br>Basal diet plus 30 mg HMG |
|---|---|---|---|---|
| 7 | 151±10 | 145±2 | 136±5 | 128±5 |
| 14 | 164±4 | 147±3 | 133±8 | 130±9 |

In a second series of tests, young male albino rats weighing about 100 grams were maintained for about 2 weeks on an experimental diet consisting of the standard laboratory diet with 2% hydrogenated vegetable oils; in addition, 20 milligrams cholesterol and 10 milligrams sodium cholate as a homogeneous water solution were administered daily by intubation, in order to produce hypercholesterolemic conditions. The serum cholesterol level was found to be significantly elevated (192±19) as compared to control rats kept on the basal diet only (118±5). The rats were then divided into 4 groups of five each. The results are shown in Table II, in which the first two groups continued receiving the experimental hypercholesterolemic diet, while the third and fourth groups listed in Table II were returned to the basal diet. The second and fourth groups received 50 milligrams of HMG per kilogram per day in water. The serum cholesterol figures shown in Table II shows that feeding HMG both to the rats continuing on the experimental diet and to the rats returned to the basal diet brings about a sharp drop in serum cholesterol, evident after only twenty-four hours:

TABLE II

| HMG treatment (day) | Total cholesterol content, mg. percent | | | |
|---|---|---|---|---|
| | Cholesterol-fed group | Cholesterol plus HMG-fed group | Hypercholesterolemic control group | HMG-fed group |
| 1st | 207±10 | 139±5 | 200±6 | 133±3 |
| 2nd | 203±4 | 129±15 | 181±4 | 138±4 |
| 3rd | 208±2 | 172±8 | 192±6 | 165±4 |
| 4th | | | 181±5 | 148±3 |
| 5th | 211±14 | 167±5 | 158±5 | 162±4 |
| 6th | | | 139±5 | 137±7 |

In a further test, designed to study the effect of HMG on hepatic cholesterols, young male albino rats weighing 100 grams were maintained for two weeks on the experimental hypercholesterolemic diet previously described. The liver cholesterol level of the rats was then found to be significantly elevated (1183±36 mg. percent) as compared to normal rats kept on the basal diet (525±29 mg. percent).

The rats were then divided into four groups of five each. The experimental conditions were as has been described in connection with Table II. The varying periods of HMG treatment as shown in Table III which follows the total cholesterol level was confirmed with the following results:

TABLE III

| HMG treatment (day) | Total cholesterol content, mg./100 g. liver | | | |
|---|---|---|---|---|
| | Cholesterol-fed group | Cholesterol plus HMG-fed group | Hypercholes-terolemic control group | HMG-fed group |
| 1 | 1,167±52 | 994±6 | 1,376±38 | 912±33 |
| 2 | 1,366±31 | 789±47 | 1,084±42 | 633±11 |
| 3 | 1,279±25 | 958±52 | 934±40 | 586±28 |
| 4 | 1,258±40 | 962±34 | 1,078±40 | 656±08 |
| 5 | 1,566±63 | 1,004±24 | 896±23 | 775±36 |
| 6 | | | 608±18 | 626±11 |

In a further study, involving a different administrative route, two groups of young male albino rats, weighing about 110 g. and each containing five animals were caged separately. Group I was kept as control and fed on basal diet. In addition to this diet, animals in Group II were given intraperitoneal injections of 20 mg. HMG/kg./day in water for three or six days. The results of this group are shown in Table IV:

TABLE IV.—EFFECT OF HMG ON SERUM LIPIDS OF NORMAL RATS

| | Basal diet | | Basal diet plus HMG | |
|---|---|---|---|---|
| | 3 days | 6 days | 3 days | 6 days |
| Total cholesterol, mg. percent | 70±2 | 100±2 | 60±4 | 83±2 |
| Ester cholesterol, mg. percent | 50±2 | 74±2 | 40±4 | 60±2 |
| Free cholesterol, mg. percent | 20±3 | 26±1 | 20±3 | 23±1 |
| Total esterfied fatty acids, meq./l | 6±0.36 | 5.2±0.28 | 5.1±0.44 | 4.11±0.14 |
| Phospholipids, mg. percent | 186±14 | 153±5 | 187±19 | 140±8 |
| Triglycerides, meq./l | 1.45±0.17 | 1.1±0.16 | 0.53±0.44 | 0.4±0.14 |
| C/P ratio | 0.389±0.001 | 0.660±0.004 | 0.339±0.004 | 0.596±0.01 |

In a related series of tests, five animals weighing about 100 g. (cholesterol-fed group) were kept on basal diet containing 2% cholesterol, 1% cholic acid and 5% hydrogenated vegetable oil. In addition to the above fat-rich cholesterol diet, other five animals (cholesterol plus HMG-fed group) were given 20 mg. HMG/kg./day intraperitoneally in water. The animals were fed the diet ad libitum for 25 days. Results of this series are shown in Table V:

TABLE V.—EFFECT OF CHOLESTEROL PLUS HMG FEEDING ON SERUM LIPIDS OF HYPERLIPEMIC RATS

| | Cholesterol-fed group | Cholesterol plus HMG-fed group |
|---|---|---|
| Total cholesterol, mg. percent | 855±35 | 780±25 |
| Ester cholesterol, mg. percent | 673±26 | 596±44 |
| Free cholesterol, mg. percent | 183±20 | 184±6 |
| Total esterfied fatty acids, meq./l | 27±3 | 21±2 |
| Phospholipids, mg. percent | 341±27 | 256±23 |
| Triglycerides, meq./l | 15±2 | 11.5±2 |

In a further related series of tests, ten male rats weighing about 100 g. were maintained on a fat-rich cholesterol diet for a period of 25 days and then divided into two groups of five each. The hyperlipemic control group was given basal diet only whereas the HMG-fed group in addition to this diet received intraperitoneal injections of 20 mg. HMG/kg./day in water for 6 days. The results of this series of tests are shown in Table VI:

TABLE VI.—EFFECT OF HMG ON SERUM LIPIDS OF HYPERLIPEMIC RATS

| | Hyperlipemic control group | HMG-fed group |
|---|---|---|
| Total cholesterol, mg. percent | 161±10 | 104±5 |
| Ester cholesterol, mg. percent | 125±12 | 67±4 |
| Free cholesterol, mg. percent | 37±4 | 37±2 |
| Total esterified fatty acids, meq./l | 9±0.23 | 6±0.5 |
| Phospholipids, mg. percent | 182±7 | 148±8 |
| Triglycerides, meq./l | 4±0.28 | 2±0.39 |
| C/P ratio | 0.885±0.004 | 0.675±0.005 |

In all the experiments, the parallel control group received injections of distilled water (1 ml.) for the same duration as indicated. At the termination of studies, blood samples were obtained by cardiac puncture.

It is evident from Table IV, that HMG administration, to normal rats for 3 to 6 days, significantly depresses the total cholesterol, esterified cholesterol, total esterified fatty acid and triglyceride levels. However, there is no significant effect on free cholesterol and phospholipid levels. The cholesterol:phospholipid (C/P) ratio was insignificantly lowered.

The data presented in Table V show that HMG treatment causes a significant decline in the levels of different lipids (except total and ester cholesterol) of hyperlipemic rats as compared to parallel cholesterol-fed group. The C/P ratio of these animals remains elevated, whereas triglycerides content is significantly depressed.

In case of Table VI where a fat-rich cholesterol diet was substituted by the basal diet (though the rats were hyperlipemic) the C/P ratio was significantly lowered. In this experiment the decrease in various types of serum lipid contents was statistically significant.

In the tables, assays are given as the average for the test group, followed by the standard error as a plus-or-minus.

The ability of HMG to lower total and ester cholesterol, total esterified fatty acids, phospholipids and triglycerides is of special importance, since elevations in these biochemical parameters have been reported as related to coronary heart disease and recently greater attention has been placed on the need for the evaluation of serum triglycerides than that of serum cholesterol. It is interesting to note that HMG causes maximum reduction of triglycerides in normal as well as cholesterol-fed rats.

It will be evident from the character of the maladies susceptible to treatment in accordance with the invention that in general the inventive therapy should be considered as a continuing one for a given subject, either to combat an inherent tendency to one of the pathological states already mentioned, or to nullify the tendency of the diet of the subject to produce such a state or states.

While we have described our invention with the aid of numerous specific examples, it will be understood that our invention is a broad one and many variations in detail of the administration and the like are possible within the broad scope of the invention, as set forth in the claims which follow.

Having described the invention, we claim:

1. The process of reducing serum cholesterol and blood lipid levels in a warm-blooded animal which comprises administering to said animal a therapeutically effective dose of 3-hydroxy-3-methylglutaric acid.

2. The process in accordance with claim 1 wherein said administration is oral.

3. The process in accordance with claim 2 wherein said administration is within a dosage range of about 1 milligram to about 100 milligrams per 24 hour day per kilogram of body weight.

4. A therapeutic composition in dosage unit form useful for combatting hypercholesterolemia and hyperlipemia consisting essentially of from about 1/20 milligram to about 10 grams of 3-hydroxy-3-methylglutaric acid in a pharmaceutical carrier.

References Cited

Beg et al.: Experientia 23(5), pp. 380 (1967).
Chem. Abst.; (I), 51, 13023i (1957).
Chem. Abst.; (II), 51, 8162e (1957).

STANLEY J. FRIEDMAN, Primary Examiner